April 17, 1951 B. I. BLICKMAN 2,549,363
FILTER
Filed Dec. 3, 1945
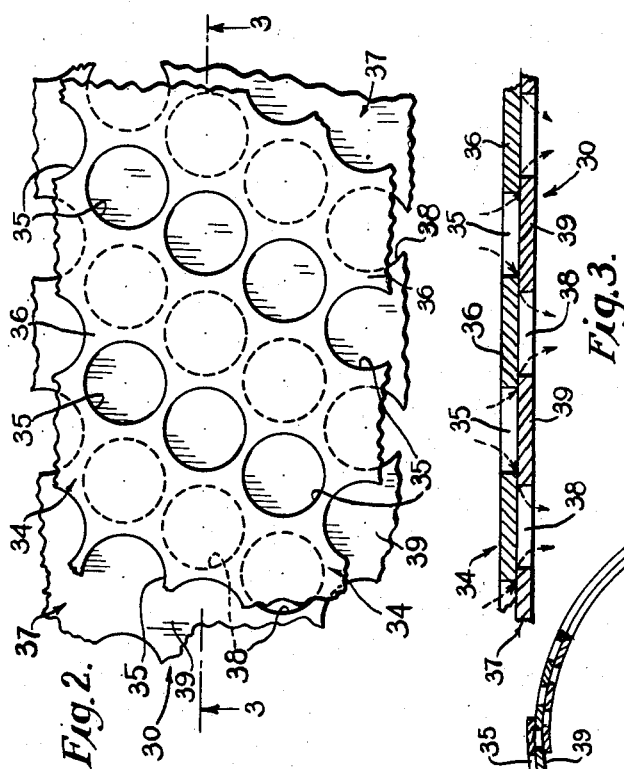
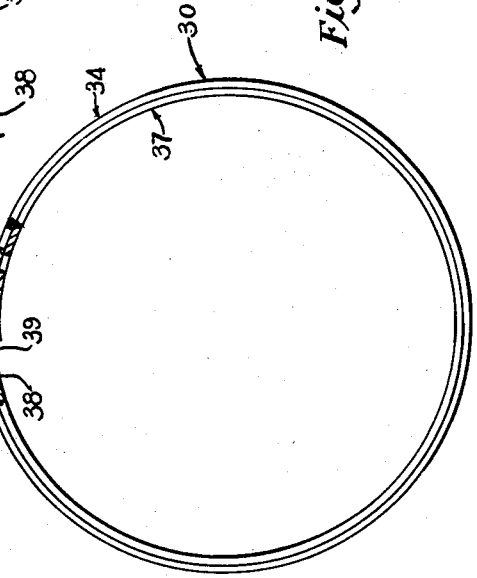
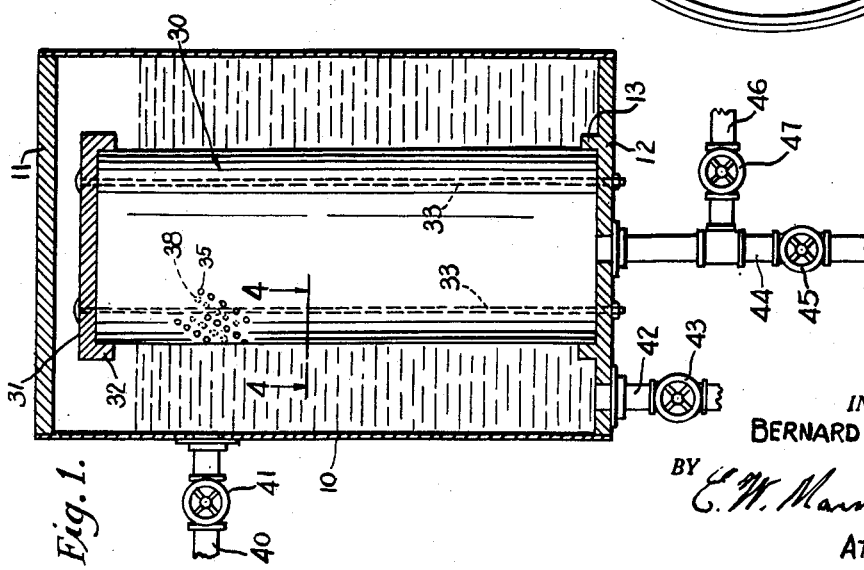
INVENTOR.
BERNARD I. BLICKMAN
BY E. W. Marshall
ATTORNEY Patented Apr. 17, 1951

2,549,363

UNITED STATES PATENT OFFICE 2,549,363

FILTER

Bernard I. Blickman, New York, N. Y., assignor to S. Blickman, Inc., Weehawken, N. J., a corporation of New York Application December 3, 1945, Serial No. 632,448

2 Claims. (Cl. 210—167)

This invention relates to a filter and its object is to provide an instrumentality of this type of simple construction and few parts which is capable of removing minute particles of solid material from a fluid without unduly clogging the restraining mechanism and which can be easily cleaned. Another object is to provide a filtering apparatus in which the fluid to be strained may be applied under pressure.

With these and other objects in view my invention will appear in the following specification in which I will describe an apparatus which embodies the invention, the novel features of which will be defined in claims.

Referring to the drawings:

Figure 1 is a diagrammatic elevation, partly in section, of an apparatus which is made according to and embodies the present invention.

Figure 2 is a plan view of overlapping portions of the material of which the strainer is made.

Figure 3 is an edge view of the parts shown in Figure 2, the section being taken on the line 3—3 of the latter figures.

Figure 4 is a plan view of the strainer element, a part of which is shown in a section taken on the line 4—4 of Figure 1.

10 designates a casing which is closed at the top and bottom by plates 11 and 12. This casing may be made conveniently of cylindrical form. An upstanding annular flange 13 is formed on the upper surface of the bottom plate 12.

The strainer element is designated generally by the reference numeral 30. It forms an important part of the invention and its construction will be particularly described hereinafter. It rests on the bottom plate 12 within its flange 13. 31 is a plate having an annular flange 32 at its rim closing the top of the filter element. The plate 31 is shown affixed to the bottom plate by rods 33, 33.

40 is an inlet pipe provided with a control valve 41. It is connected with the casing at a side thereof. 42 is a drain pipe connected with an opening through the bottom plate 12. It is provided with a control valve 43. 44 is a pipe which extends through the bottom plate 12 within the flange 13 into communication with the interior of the strainer element 30. 45 is a valve in the pipe 44. Another pipe 46 controlled by a valve 47 is connected to the pipe 44 between its upper end and the valve 45.

The strainer element is made of comparatively thin flexible perforated sheet metal or other material, two layers of which are shown in Figs. 2, 3 and 4 designated by 34 and 37. The perforations in the upper layer 34 (as seen in Fig. 3) are designated by the numeral 35. They are preferably small circular orifices relatively spaced in the manner shown and separated by solid portions 36 of the sheet material. The perforations in the lower layer 37 (Fig. 3) are designated by the numeral 38 and are separated by solid portions 39 of the material.

As shown in Fig. 3, the layers 34 and 37 are so juxtaposed that the perforations in each register with the solid portions of the other. Thus, there are overlapping solid portions of the sheet material between all of the perforations.

The filtering element 30 may be made of a single sheet of perforated material wound to form a cylinder of multiple thickness, two being shown in Fig. 4. The layers may be spot-welded together at intervals to maintain their perforations and solid portions in the desired relative positions just described. The cylinder thus formed is held preferably in a vertical position between the flange 13 of the bottom plate and the annular flange 32 of the plate 31.

The operation of the apparatus is as follows:

The fluid to be clarified is led through the pipe 40 into the casing 10, preferably under pressure. It passes through the wall of the strainer element 30 and escapes through the pipe 44. During this operation the valves 43 and 47 are closed.

In passing into the strainer the fluid passes through the perforations 35 in the outer layer of the sheet material, between overlapping solid portions of the two layers and through the perforations 38 of the inner layer. This is indicated by dotted-line arrows in Fig. 3. In doing this, any particles of foreign matter which are in the fluid admitted to the casing 10 are arrested at the peripheries of the perforations 35 in the outer layer.

A convenient way of cleaning the filtering element is by a reverse flow of a fluid. This is accomplished by closing valves 41 and 45 and opening valves 43 and 47. Air, water or other fluid is admitted through the pipes 46 and 44 to the inside of the filtering element and passes through the two layers thereof into the casing 10 in the reverse direction from that first described. This dislodges such particles as have been arrested at the peripheries of the perforations 35 and they escape with the cleaning fluid through the pipe 42.

Various modifications in construction, mode of operation, method and use of an invention may and do occur to others, especially after benefiting from knowledge of such a disclosure as that herein presented of the principles involved, but the invention itself is not confined to the present showing.

I claim:

1. A filtering apparatus comprising a cylindrical shell, a bottom closure plate having an upstanding annular flange of less diameter than that of the shell and a top closure plate, a hollow cylindrical strainer having a wall formed of a single elongated piece of sheet material wound into a plurality of layers lying upon one another, said sheet being constructed to form a plurality of equally spaced openings with intermediate solid portions disposed to position the solid portions of each layer permanently over the openings in the proximate layer, said strainer resting upon the bottom closure plate within its upstanding flange, a third plate over the upper end of the strainer having a downwardly extending edge surrounding said upper end of the strainer, means for interconnecting said bottom closure plate and said third plate, and means for forcing liquid under pressure alternately from the shell into the strainer and from the strainer into the shell.

2. A filtering apparatus comprising a cylindrical shell, a bottom closure plate having an upstanding annular flange of less diameter than that of the shell and a top closure plate, a hollow cylindrical strainer having a wall formed of a single elongated piece of sheet material wound into a plurality of layers lying upon one another, said sheet being constructed to form a plurality of equally spaced circular openings with intermediate solid portions disposed to position the solid portions of each layer permanently over the openings in the proximate layer, said strainer resting upon the bottom closure plate within its upstanding flange, a third plate over the upper end of the strainer having a downwardly extending edge surrounding said upper end of the strainer, means for interconnecting said bottom closure plate and said third plate, a valved inlet conduit communicating with the part of the shell outside of the strainer, a valved drain conduit communicating with the part of the shell outside of the strainer, a pipe passing through the bottom closure plate into the strainer, said pipe having a valved discharge portion, and a valved inlet conduit communicating with said pipe between the discharge portion thereof and said bottom closure plate.

BERNARD I. BLICKMAN.

REFERENCES CITED

The following references are of record in the file of this patent:

UNITED STATES PATENTS

| Number | Name | Date |
|---|---|---|
| 632,570 | Howard | Sept. 5, 1899 |
| 744,060 | Frye | Nov. 17, 1903 |
| 772,389 | Webb | Oct. 18, 1904 |
| 810,250 | Barth | Jan. 16, 1906 |
| 1,201,268 | Davis | Oct. 17, 1916 |
| 1,456,095 | Collins | May 22, 1923 |
| 2,269,031 | MacArthur | Jan. 6, 1942 |
| 2,339,703 | Kamrath | Jan. 18, 1944 |
| 2,354,481 | Russell | July 25, 1944 |

FOREIGN PATENTS

| Number | Country | Date |
|---|---|---|
| 324,034 | Great Britain | Jan. 13, 1930 |